(12) United States Patent
Tomohara et al.

(10) Patent No.: US 9,041,268 B2
(45) Date of Patent: May 26, 2015

(54) ROTARY ELECTRIC MACHINE

(71) Applicant: KABUSHIKI KAISHA YASKAWA DENKI, Fukuoka (JP)

(72) Inventors: Kenji Tomohara, Fukuoka (JP); Akihiko Maemura, Fukuoka (JP)

(73) Assignee: KABUSHIKI KAISHA YASKAWA DENKI, Kitakyushu-Shi, Fukuoka (JP)

( * ) Notice: Subject to any disclaimer, the term of this patent is extended or adjusted under 35 U.S.C. 154(b) by 140 days.

(21) Appl. No.: 13/765,718

(22) Filed: Feb. 13, 2013

(65) Prior Publication Data
US 2013/0207508 A1 Aug. 15, 2013

(30) Foreign Application Priority Data

Feb. 13, 2012 (JP) ................. 2012-028195

(51) Int. Cl.
H02K 1/27 (2006.01)
(52) U.S. Cl.
CPC .............. *H02K 1/278* (2013.01); *H02K 1/2766* (2013.01)
(58) Field of Classification Search
USPC ............. 310/156.44, 156.53, 156.54, 156.56, 310/156.57
IPC .......................................... H02K 1/276, 1/2776
See application file for complete search history.

(56) References Cited

U.S. PATENT DOCUMENTS

| | | | |
|---|---|---|---|
| 6,906,442 B2 * | 6/2005 | Yamaguchi | 310/156.43 |
| 7,898,137 B2 * | 3/2011 | Miyata | 310/156.38 |
| 8,648,513 B2 * | 2/2014 | Nakano et al. | 310/156.38 |
| 2005/0110356 A1 * | 5/2005 | Imamura et al. | 310/156.53 |
| 2009/0224623 A1 * | 9/2009 | Saito et al. | 310/156.53 |
| 2011/0140562 A1 | 6/2011 | Kato et al. | |

FOREIGN PATENT DOCUMENTS

| | | |
|---|---|---|
| CN | 100344045 C | 10/2007 |
| CN | 102035277 A | 4/2011 |
| JP | H01-286758 | 11/1989 |
| JP | H04-071342 A | 3/1992 |
| JP | 2002-305859 A | 10/2002 |
| JP | 2005-117855 A | 4/2005 |
| JP | 2008-245406 A | 10/2008 |
| JP | 2011-083119 A | 4/2011 |

OTHER PUBLICATIONS

Japanese Office Action dated Dec. 17, 2013 issued in corresponding Japanese application No. 2012-028195 and the English translation thereof.
Korean Office Action dated Mar. 6, 2014 issued in corresponding Korean application No. 10-2013-0015113 and the English translation thereof.

(Continued)

*Primary Examiner* — Dang Le
(74) *Attorney, Agent, or Firm* — Bacon & Thomas, PLLC

(57) ABSTRACT

A rotary electric machine includes a rotor core in which first magnetic pole portions having permanent magnets and second magnetic pole portions having no permanent magnets are alternately arranged in a circumferential direction; and a stator core which is arranged to face an outer periphery of the rotor core. The rotor core is configured such that an average gap length between the stator core and the second magnetic pole portions is larger than an average gap length between the stator core and the first magnetic pole portions.

20 Claims, 11 Drawing Sheets

(56) References Cited

OTHER PUBLICATIONS

The Chinese Office Action dated Nov. 25, 2014, issued in a corresponding Chinese application No. 201310050826.4 and the English translation thereof.

Korean Office Action dated Aug. 14, 2014, issued in corresponding Korean application No. 10-2013-0015113 and the English translation thereof.

* cited by examiner

US 9,041,268 B2

ROTARY ELECTRIC MACHINE

CROSS-REFERENCE TO RELATED APPLICATIONS

The present disclosure contains subject matter related to that disclosed in Japanese Priority Patent Application No. 2012-028195 filed with Japan Patent Office on Feb. 13, 2012, the entire contents of which are incorporated herein by reference.

BACKGROUND OF THE INVENTION

1. Field of the Invention

Disclosed embodiments relate to a rotary electric machine.

2. Description of the Related Art

Conventionally, there is known an electric motor (rotary electric machine) having a rotor core (see, e.g., Japanese Patent Laid-open Publication No. H1-286758).

Japanese Patent Laid-open Publication No. H1-286758 discloses an electric motor (rotary electric machine) including a rotor core having a plurality of permanent magnets. In this motor, the permanent magnets are arranged at predetermined intervals in a circumferential manner on the outer periphery of the rotor core. Further, the rotor core between the adjacent permanent magnets is formed in a shape of protrusion. That is, the permanent magnets and the protruding portions of the rotor core are alternately arranged one by one.

Thus, it is configured to obtain a magnet torque between the permanent magnet and winding provided in a stator, and a reluctance torque between the rotor core and the winding provided in the stator. Also, the reluctance torque is increased or decreased in response to a difference (Ld−Lq) between the d-axis inductance (Ld) and the q-axis inductance (Lq). Herein, the d-axis means an axis is in a direction of a main magnetic flux, and the q-axis means an axis is in a direction electrically perpendicular to the d-axis.

SUMMARY OF THE INVENTION

In accordance with an aspect of the disclosed embodiments, there is provided a rotary electric machine including a rotor core in which first magnetic pole portions having permanent magnets and second magnetic pole portions having no permanent magnets are alternately arranged in a circumferential direction; and a stator core which is arranged to face an outer periphery of the rotor core, wherein the rotor core is configured such that an average gap length between the stator core and the second magnetic pole portions is larger than an average gap length between the stator core and the first magnetic pole portions.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Hereinafter, embodiments will be described in detail with reference to the accompanying drawings.

First Embodiment

First, a configuration of a motor 100 in accordance with a first embodiment of the disclosure will be described with reference to FIGS. 1 to 4. The motor 100 is an example of "rotary electric machine".

Figure 1:
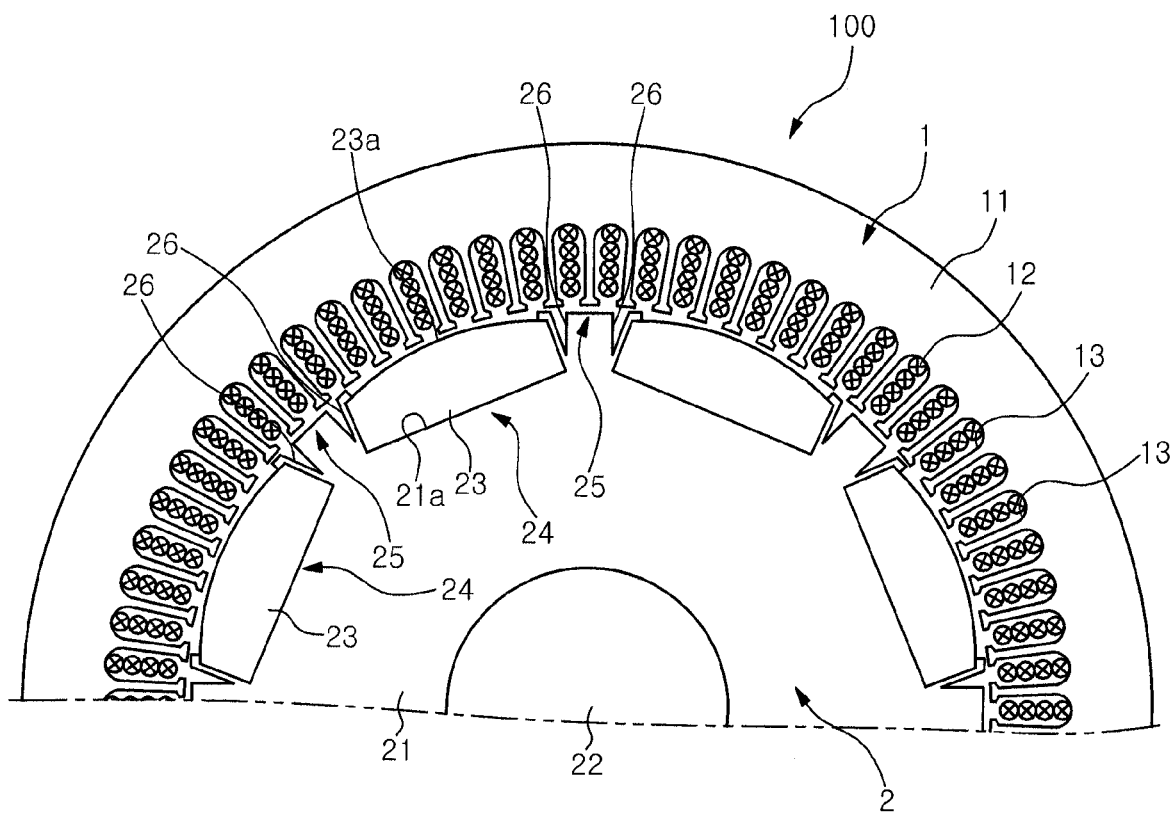
FIG. 1 is a plan view of a motor in accordance with a first embodiment of the disclosure.

As shown in FIG. 1, the motor 100 includes a stator 1 and a rotor 2. The stator 1 is arranged so as to face an outer peripheral portion of the rotor 2 (rotor core 21). The stator 1 also includes a stator core 11 and windings 12. At an inner side of the stator core 11, a plurality of slots 13 are formed.

The rotor 2 includes the rotor core 21, a shaft 22, and permanent magnets 23. In the first embodiment, the rotor core 21 includes a plurality of first magnetic pole portions 24 having the permanent magnets 23 and a plurality of second magnetic pole portions 25 having no permanent magnets 23 which are alternately arranged one by one in a circumferential manner. Further, each of the second magnetic pole portions 25 is configured as a protruding portion of the rotor core 21 located between two permanent magnets 23 adjacent to each other.

Figure 3:
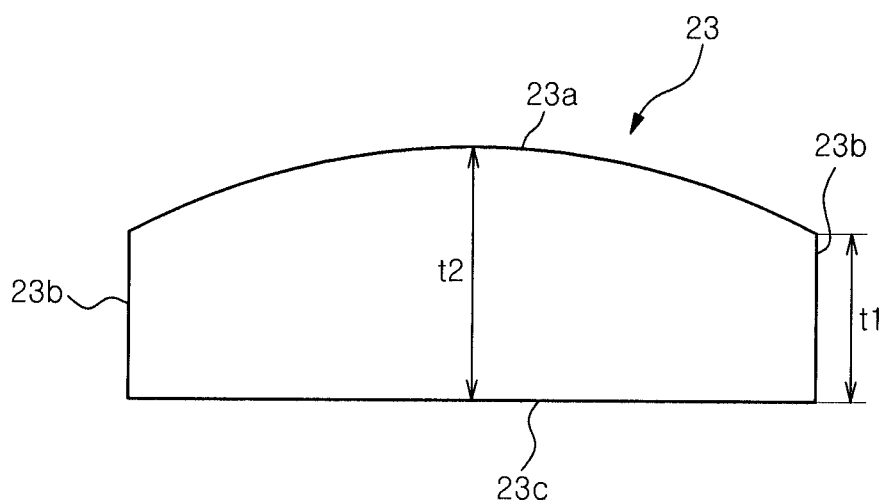
FIG. 3 is a plan view of a permanent magnet of the motor in accordance with the first embodiment.

As shown in FIG. 3, a surface 23a of each of the permanent magnets 23 on the side of the stator core 11 is formed in a convex (arcuate) shape toward the stator core 11 when viewed from the axial direction. The radius of curvature of the surface 23a is smaller than that of an inner peripheral portion of the stator core 11. Both side surfaces 23b of the permanent magnet 23 in the circumferential direction of the rotor and a surface 23c of the permanent magnet 23 on the inner peripheral side of the rotor core 21 are formed in a linear shape (flat surface shape) when viewed from the axial direction.

Figure 2:
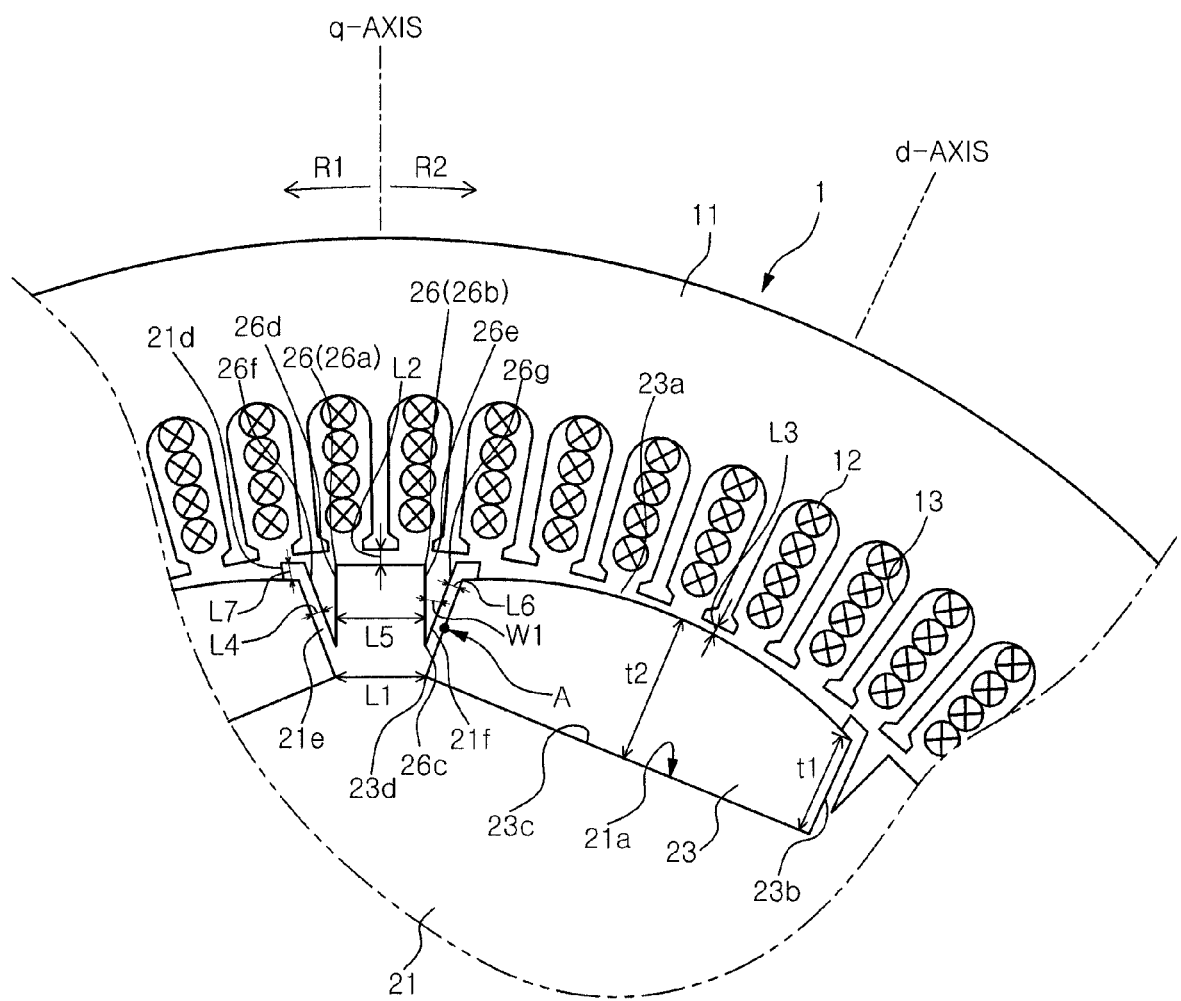
FIG. 2 is an enlarged view of the motor shown in FIG. 1.

In the first embodiment, the permanent magnet 23 has a shape such that a thickness t2 of the central portion in the circumferential direction is larger than a thickness (i.e., length of the side surfaces 23b in the circumferential direction of the rotor) t1 of the end portion in the circumferential direction. Further, as shown in FIGS. 1 and 2, the permanent magnets 23 are disposed substantially equidistant in the circumferential direction. The thickness of the permanent magnets 23 in the radial direction of the rotor is larger than a minimum interval L1 between the permanent magnets 23 of the two first magnetic pole portions adjacent to each other (distance on the innermost peripheral side between the two adjacent permanent magnets 23). Additionally, the permanent magnet 23 is constituted by a ferrite permanent magnet.

Figure 4:
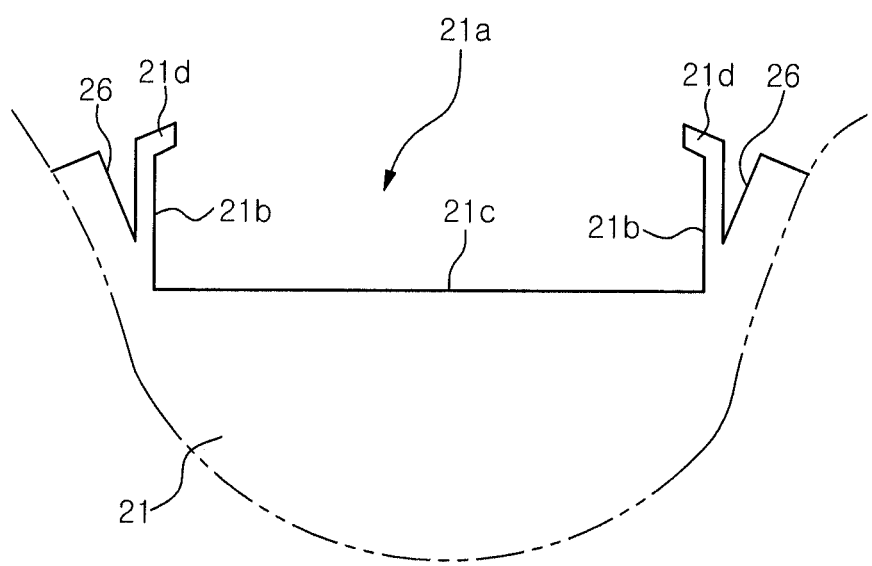
FIG. 4 is a plan view of a rotor core of the motor in accordance with the first embodiment.

In the first embodiment, the permanent magnets 23 are embedded along the circumferential direction in the vicinity of the outer periphery of the rotor core 21. More specifically, the permanent magnets 23 are arranged on mounting portions 21a provided at the outer peripheral portion of the rotor core 21. As shown in FIG. 4, the mounting portions 21a are formed in a groove shape opened on the side of the stator core 11. Thus, as shown in FIG. 2, a portion (portion other than both end portions of the permanent magnet 23) of the surface 23a of the permanent magnet 23 on the side of the stator core 11 is exposed.

As shown in FIG. 4, each of the mounting portions 21a includes side portions 21b in contact with the side surfaces 23b (see FIG. 2) of the permanent magnet 23 and having a straight line shape when viewed from the axial direction, a bottom portion 21c in contact with the surface 23c (see FIG. 2) of the permanent magnet 23 on the inner peripheral side of the rotor core 21 and having a straight line shape when viewed from the axial direction. Each of the mounting portions 21a further includes claw portions 21d engaging with opposite end portions of the surface 23a (see FIG. 2) of the permanent magnet 23 in the circumferential direction. Further, the claw portions 21d have a function to prevent the permanent magnet 23 from popping out of the rotor core 21 when the rotor core 21 is rotated.

In the first embodiment, as shown in FIG. 2, the rotor core 21 is configured to have an average value of a gap length L2 between the second magnetic pole portions 25 and the stator core 11 larger than an average value of a gap length L3 between the first magnetic pole portions 24 and the stator core 11. Further, in the first magnetic pole portion 24 (permanent magnet 23), the surface 23a on the side of the stator core 11 is formed in a circular arc shape having a radius of curvature smaller than that of the inner periphery of the stator core 11. The permanent magnet 23 is the closest to the stator core 11 in the central portion of the permanent magnet 23 in the circumferential direction.

For example, the gap length L3 between the stator core 11 and a portion of the permanent magnet 23 closest thereto is about 0.4 mm. Also, the outer peripheral surface of each of the second magnetic pole portions 25 is configured to have a radius of curvature substantially the same as the stator core 11. Thus, the gap length L2 between the stator core 11 and the second magnetic pole portions 25 is substantially equal along the circumferential direction. For example, the gap length L2 between the stator core 11 and the second magnetic pole portions 25 is about 1 mm.

As shown in FIGS. 1 and 2, notches 26 are provided in portions of the second magnetic pole portions 25 on the side of the permanent magnets 23. The notches 26 are formed so as to extend in the axial direction (perpendicular to the paper surface) of the rotor core 21. In addition, the notches 26 are provided in each of the second magnetic pole portions 25. As shown in FIG. 2, the notches 26 include a notch 26a which is provided in a portion of the second magnetic pole portion 25 adjacent to the permanent magnet 23 in one circumferential direction (direction of arrow R1), and a notch 26b which is provided at a portion of the second magnetic pole portion 25 adjacent to the permanent magnet 23 in the other circumferential direction (direction of arrow R2).

In the rotor core 21, a thickness L4 (see FIG. 2) of a portion 21e located between the notch 26a and the side surface 23b of the permanent magnet 23 adjacent to the notch 26a is smaller than a width L5 (length in the direction perpendicular to the radial direction) (see FIG. 2) of the second magnetic pole portion 25 between the notches 26a and 26b. Similarly, in the rotor core 21, a thickness L6 (see FIG. 2) of a portion 21f located between the notch 26b and the side surface 23b of the permanent magnet 23 adjacent to the notch 26b is smaller than the width L5 (length in the direction perpendicular to the radial direction) (see FIG. 2) of the second magnetic pole portion 25 between the notches 26a and 26b. In addition, the thickness L4 (L6) of the portion 21e (21f) of the rotor core 21 is substantially equal to a length L7 of the claw portions 21d of the rotor core 21 in the radial direction.

Each of the notches 26 is formed in a substantially V shape such that a width W1 of the notch 26 is gradually reduced toward the inner peripheral side of the rotor core 21 when viewed from the axial direction. The bottom end 26c of the notch 26 on the inner peripheral side of the rotor core 21 is located radially outward of the bottom end 23d of the side surface 23b of the permanent magnet 23 on the inner peripheral side of the rotor core 21. Further, the bottom end 26c of the notch 26 may be located radially at a same position as that of the bottom end 23d of the permanent magnet 23 in the rotor core 21. In addition, the bottom end 26c of the notch 26 is located radially inward of a midpoint (point A) of the side surface 23b of the permanent magnet 23 in a thickness direction thereof.

A surface 26d (26e) of the notch 26, i.e., the notch 26a (26b), opposite to the permanent magnets 23 is disposed in a direction along the q-axis of the motor 100. That is, the inner surface 26d of the notch 26a and the inner surface 26e of the notch 26b are disposed to be substantially parallel to the q-axis. Further, the q-axis means an axis in a direction electrically perpendicular to the d-axis which is in a direction of a main magnetic flux. Further, an inner surface 26f (inner surface 26g) of the notch 26 on the side of the permanent magnet 23 is arranged in a direction (direction intersecting the q-axis) substantially parallel to the side surface 23b of the permanent magnet 23.

Next, with reference to FIGS. 5 to 7, a relationship between inductance and current supplied to the windings 12 of the motor 100 in accordance with the first embodiment will be described in comparison with a comparative example shown in FIG. 5.

Figure 5:
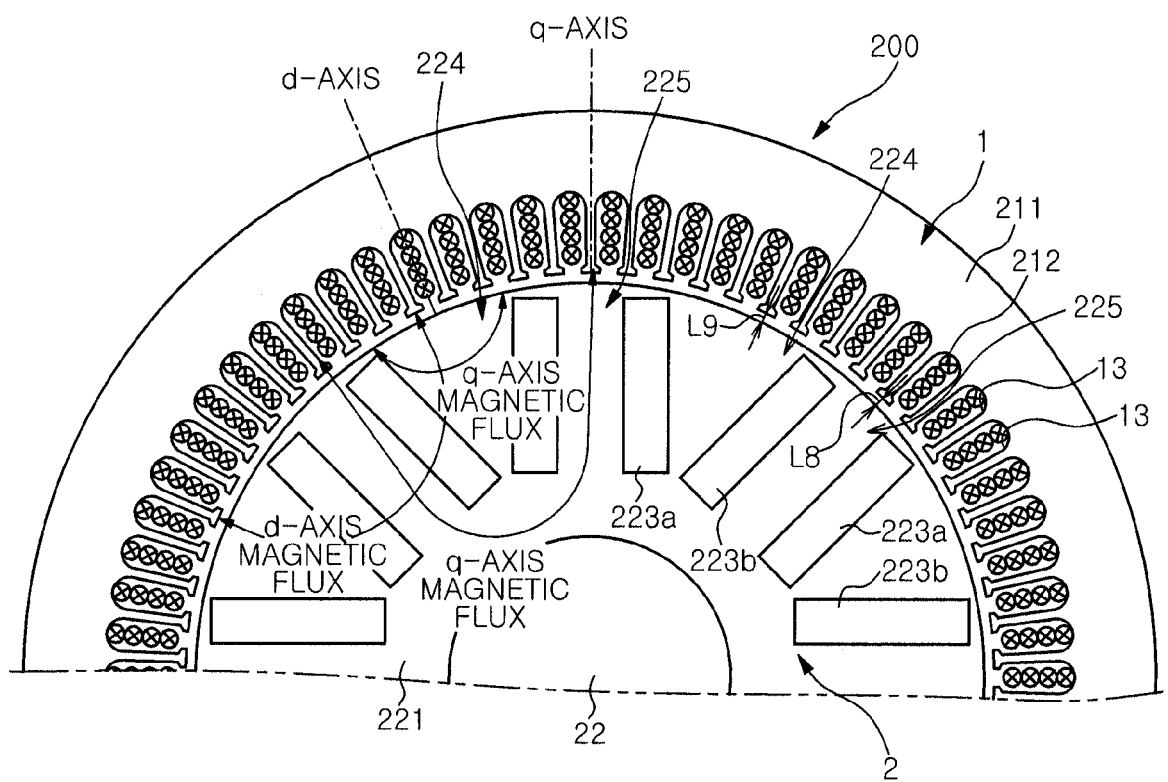
FIG. 5 is a plan view of a motor according to a comparative example.

As shown in FIG. 5, two permanent magnets 223a and 223b which are arranged in a V shape are provided in a motor 200 according to the comparative example. In the motor 200 according to the comparative example, unlike the motor 100 of the first embodiment, a rotor core 221 is configured such that an average value of a gap length L8 between a stator core 211 and a second magnetic pole portion 225 is equal to an average value of a gap length L9 between the stator core 211 and a first magnetic pole portion 224.

In the motor 200 according to the comparative example, magnetic flux due to the d-axis current is generated to pass through the permanent magnets 223a and 223b in the rotor core 221. Further, magnetic flux caused by the q-axis current is generated to respectively pass along the inside and outside of the V-shaped arrangement of the permanent magnets 223a and 223b in the rotor core 221.

Figure 6:
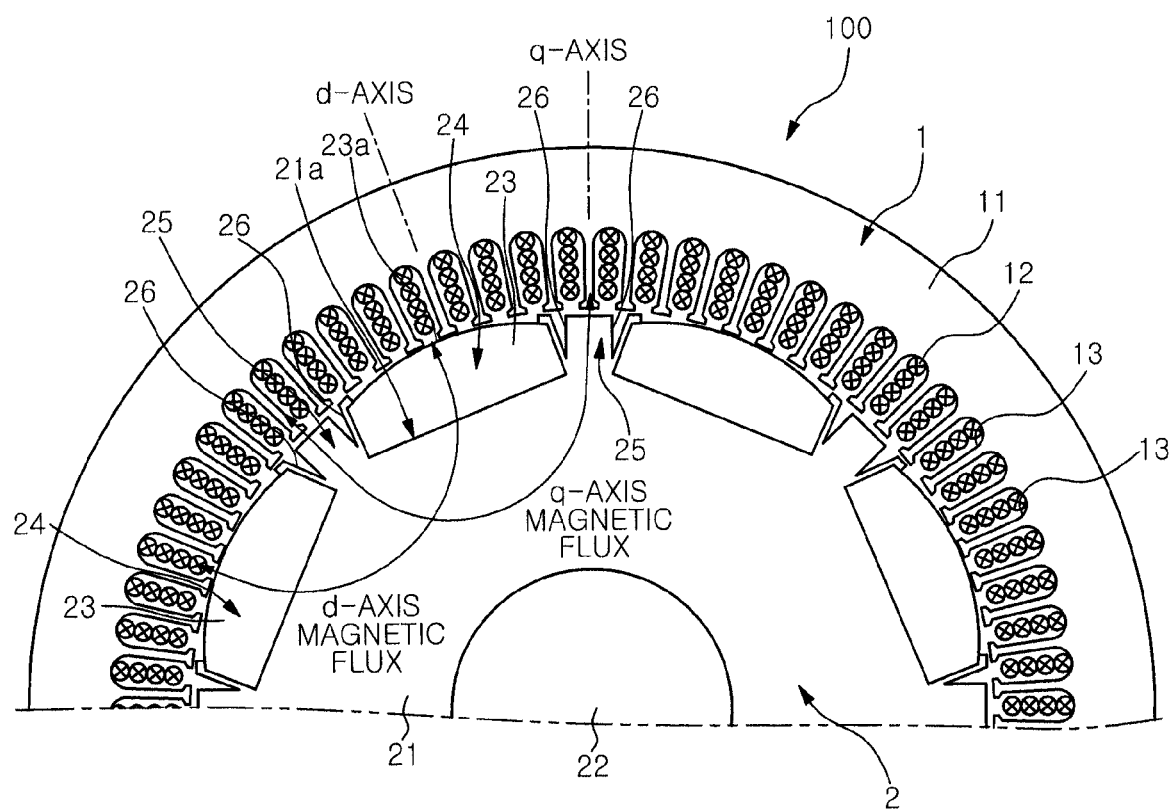
FIG. 6 is a diagram for explaining a magnetic flux generated in the motor in accordance with the first embodiment.

Contrastingly, in the motor 100 of the first embodiment, as shown in FIG. 6, the magnetic flux due to the d-axis current is generated to pass through the two adjacent permanent magnets 23 in the rotor core 21. In addition, the magnetic flux due to the q-axis current is generated to pass around the permanent magnet 23 in the inner peripheral side of the rotor core 21. In the motor 100, since the permanent magnets 23 are embedded in the vicinity of the outer periphery of the rotor core 21, the magnetic flux due to the q-axis current is suppressed from occurring in a portion of the rotor core 21 located radially outward of the permanent magnets 23. Referring to FIGS. 2 and 6, the thickness of the permanent magnets 23 in the direction of the d-axis magnetic flux passing through the permanent magnets 23 is larger than the minimum interval L1 between two adjacent permanent magnets 23.

Figure 7:
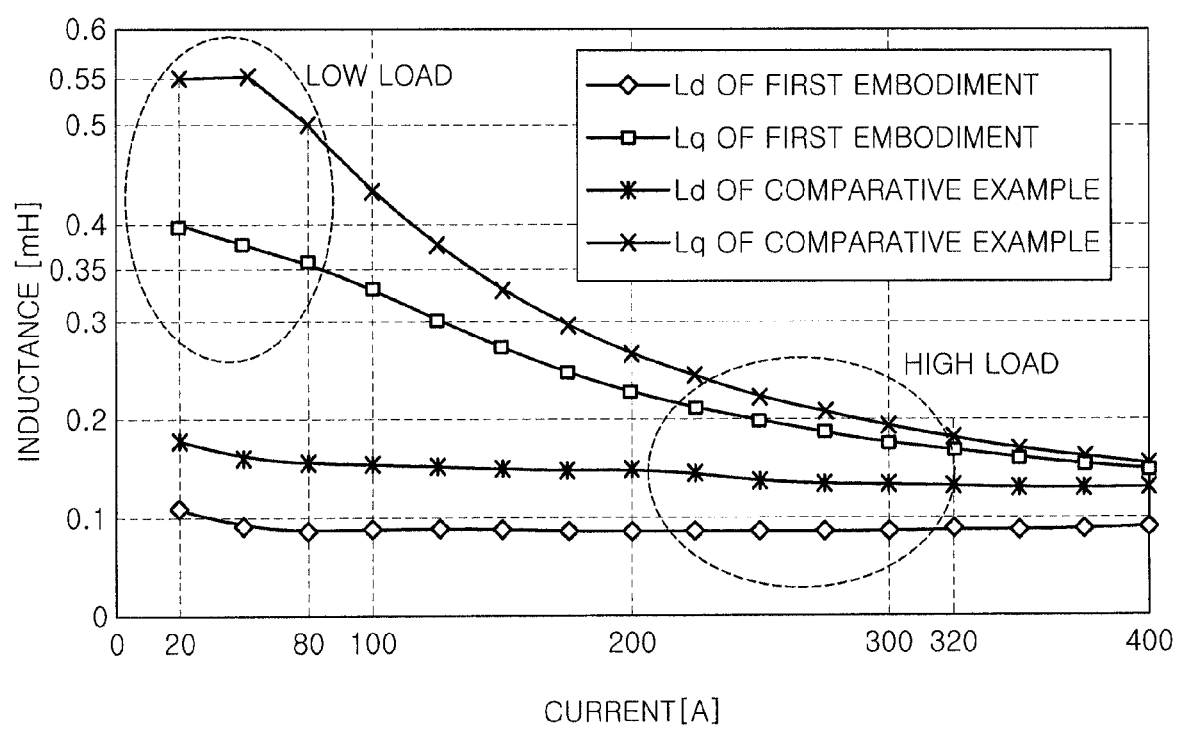
FIG. 7 is a diagram showing a relationship between inductance and current of the motor according to the first embodiment and the motor according to the comparative example.

As shown in FIG. 7, in the motor 200 according to the comparative example, when current flowing through windings 212 is relatively small (about 20 A-about 80 A) (low load), the q-axis inductance Lq is relatively large (about 0.5 mH-about 0.55 mH). Therefore, in the motor 200 according to the comparative example, in the case of high-speed rotation, an output of the motor 200 is limited by voltage saturation (state where magnitude of a voltage required to obtain a desired torque from the motor 200 exceeds a voltage limit value).

In the motor 200 according to the comparative example, when the current flowing through the windings 212 is relatively large (about 200 A-about 320 A) (high load), the q-axis inductance Lq is sharply decreased compared to the case of the low load. It is considered that this is because in the motor 200 according to the comparative example, two permanent magnets 223a and 223b are arranged in a V shape, and when the current is increased, the magnetic flux in the rotor core 221 is saturated on the inside and outside of the V-shaped arrangement of the permanent magnets 223a and 223b. Further, in the motor 200 according to the comparative example, the d-axis inductance Ld decreases gradually as the current flowing through the windings 212 increases and then becomes substantially constant in the case of the low load.

In the motor 100 according to the first embodiment, when the current flowing through the windings 12 is relatively small (about 20 A-about 80 A) (low load), the q-axis inductance Lq is about 0.35 mH-about 0.4 mH, and is smaller than the q-axis inductance Lq (about 0.5 mH-about 0.55 mH) of the motor 200 according to the comparative example. This is considered to be due to the following reasons.

In the first embodiment, the rotor core 21 is configured such that the average value of the gap length L2 between the stator core 11 and the second magnetic pole portions 25 is larger than that of the gap length L3 between the stator core 11 and the first magnetic pole portions 24. Accordingly, the magnetic flux caused by the q-axis current is difficult to pass through a space (air) between the stator core 11 and the second magnetic pole portions 25 compared to the case of the comparative example. As a result, the q-axis inductance Lq in the case of the first embodiment is smaller than that of the comparative example.

In addition, the permanent magnets 23 are arranged in the vicinity of the outer periphery of the rotor core 21, so that, unlike the conventional motor 200, the q-axis inductance Lq is suppressed from occurring in the outer peripheral side of the permanent magnets 23, and the q-axis inductance Lq is reduced correspondingly. Meanwhile, in the first embodiment, while the q-axis inductance Lq is reduced at the high load compared with at the low load, the reduction degree of the q-axis inductance Lq is lower as compared to the conventional motor 200.

Further, in the motor 100 according to the first embodiment, the d-axis inductance Ld decreases gradually as the current flowing through the windings 12 increases, and is then substantially constant. The d-axis inductance Ld of the motor 100 according to the first embodiment is smaller than that of the d-axis inductance Ld of the motor 200 according to the comparative example. This is considered to be due to the following reasons. That is, since a thickness t2 of the permanent magnets 23 corresponds to about twice the thickness of the permanent magnets 223a and 223b of the motor 200 according to the comparative example, the magnetic flux due to the d-axis current is difficult to pass through the d-axis path. As a result, it is considered that the d-axis inductance Ld becomes smaller.

In addition, when the current flowing through the windings 12 (windings 212) is relatively large (about 200 A-about 320 A) (high load), a difference between the d-axis inductance Ld and the q-axis inductance Lq of the motor 100 according to the first embodiment is larger than a difference between the d-axis inductance Ld and the q-axis inductance Lq of the motor 200 according to the comparative example. That is, in the motor 100 according to the first embodiment, it is possible to obtain a reluctance torque greater than that of the motor 200 according to the comparative example.

In the first embodiment, as described above, the rotor core 21 is configured such that the average value of the gap length L2 between the stator core 11 and the second magnetic pole portions 25 is larger than that of the gap length L3 between the stator core 11 and the first magnetic pole portions 24. Accordingly, the magnetic flux (magnetic flux due to the q-axis current) becomes difficult to pass through a space (air) between the stator core 11 and the second magnetic pole portions 25 by an increase in the average value of the gap length L2 between the second magnetic pole portions 25 and the stator core 11. As a result, it is possible to reduce the q-axis inductance Lq at a low load. Furthermore, since the occurrence of voltage saturation is suppressed due to the fact that there is less increase in impedance due to inductance components of the d and q axes (q-axis in particular) at the time of high-speed rotation, it is possible to obtain a predetermined output.

In the first embodiment, as described above, the permanent magnets 23 are embedded in the vicinity of the outer periphery of the rotor core 21. That is, a length of the permanent magnets 23 in the circumferential direction of the rotor core 21 is larger than a length (i.e., a thickness of the permanent magnets 23) in the radial direction of the rotor. Thus, since the magnetic flux due to the q-axis current is suppressed from occurring at the portion of the rotor core 21 on the outer peripheral side of the permanent magnets 23, it is possible to further reduce the q-axis inductance Lq.

In the first embodiment, as described above, the permanent magnets 23 are embedded along the circumferential direction in the vicinity of the outer periphery of the rotor core 21. As in the motor 200 (see FIG. 5) according to the comparative example, when the two permanent magnets 223a and 223b are arranged in a V shape, the two permanent magnets 223a and 223b are closer to each other on the inner peripheral side (base of the V shape) of the rotor core 221.

Accordingly, permeance (reciprocal of magnetic resistance) of the permanent magnets is reduced and demagnetization is likely to occur. In contrast, by embedding the permanent magnets 23 along the circumferential direction in the vicinity of the outer periphery of the rotor core 21 in the first embodiment, it is possible to increase the minimum interval between the adjacent permanent magnets 23. Thus, it is possible to increase the permeance (reciprocal of the magnetic resistance) of the permanent magnets 23, and suppress the permanent magnets 23 from being easily demagnetized.

In the motor 200 (see FIG. 5) according to the comparative example in which the two permanent magnets 223a and 223b are arranged in a V shape, however, magnetization directions of two permanent magnets 223a and 223b intersect each other. Therefore, it is difficult to perform the magnetization on the permanent magnets 223a and 223b after arranging the two permanent magnets 223a and 223b in the rotor core 21. As a result, in the first embodiment in which the permanent magnets 23 are embedded along the circumferential direction in the vicinity of the outer periphery of the rotor core 21, it is possible to easily perform the magnetization on the permanent magnets 23 after arranging the permanent magnets 23 in the rotor core 21.

In the first embodiment, as described above, the permanent magnets 23 are configured to have a shape such that the thickness t2 of the central portion in the circumferential direction is larger than the thickness t1 of the end portion in the circumferential direction. Thus, since the magnetic flux due to the d-axis current becomes difficult to pass through the permanent magnet 23, it is possible to reduce the d-axis inductance Ld. As a result, it is possible to obtain a larger reluctance torque by increasing a difference (Ld−Lq) between the d-axis inductance (Ld) and the q-axis inductance (Lq).

Additionally, in the first embodiment, as described above, the permanent magnets 23 are configured to have the thickness t1 (t2) larger than the minimum interval L1 between two adjacent permanent magnets 23. Therefore, it is possible to effectively reduce the d-axis inductance Ld.

In the first embodiment, as described above, the permanent magnets 23 are arranged in the vicinity of the outer periphery of the rotor core 21 to expose at least a portion of the surface 23a of each of the permanent magnets on the side of the stator core 11. Accordingly, the rotor core 21 is configured such that the average value of the gap length L2 between the stator core 11 and the second magnetic pole portions 25 is larger than the average value of the gap length L3 for the stator core 11 in the first magnetic pole portions 24. Thus, since it is possible to make the exposed portions of the permanent magnets 23 closer to the stator core 11, it is possible to further increase magnetic torque.

Further, in the first embodiment, as described above, the permanent magnets 23 are formed of ferrite permanent magnets. The ferrite magnets have a weak magnetic force compared to rare earth magnets. In accordance with embodiments disclosed herein, since the reluctance torque is effectively available, it is possible to easily obtain a desired output even in case of using the ferrite permanent magnets.

Second Embodiment

Next, a motor 101 of a second embodiment will be described with reference to FIGS. 8 and 9. Unlike the first embodiment in which the surface 23a of each of the permanent magnets 23 on the side of the stator core 11 is exposed, the motor 101 of the second embodiment is embedded in a rotor core 31 such that a surface 33a of each of permanent magnets 33 on the side of the stator core 11 is not exposed. The motor 101 is an example of "rotary electric machine" in accordance with embodiments disclosed herein.

Figure 8:
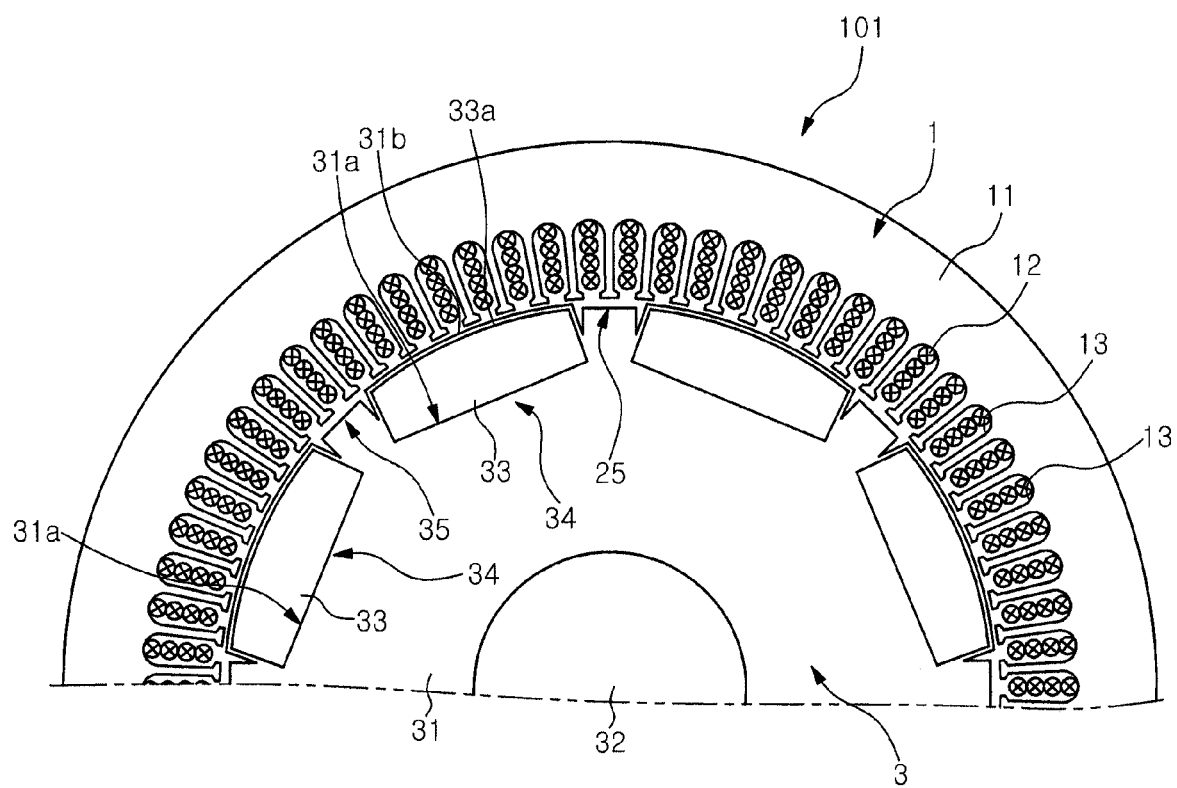
FIG. 8 is a plan view of a motor in accordance with a second embodiment of the disclosure.

As shown in FIG. 8, a rotor 3 of the motor 101 in accordance with the second embodiment includes a rotor core 31, a shaft 32, and the permanent magnets 33. In the rotor core 31, a plurality of first magnetic pole portions 34 having permanent magnets 33 and a plurality of second magnetic pole portions 35 having no permanent magnets 33 are alternately arranged one by one in a circumferential manner. Further, the permanent magnets 33 are embedded along the circumferential direction in the vicinity of the outer periphery of the rotor core 31 such that the surface 33a of each of the permanent magnets 33 on the side of the stator core 11 is not exposed. Specifically, the permanent magnets 33 are embedded in mounting portions 31a formed in a hole shape to cover the outer periphery of the permanent magnets 33.

Figure 9:
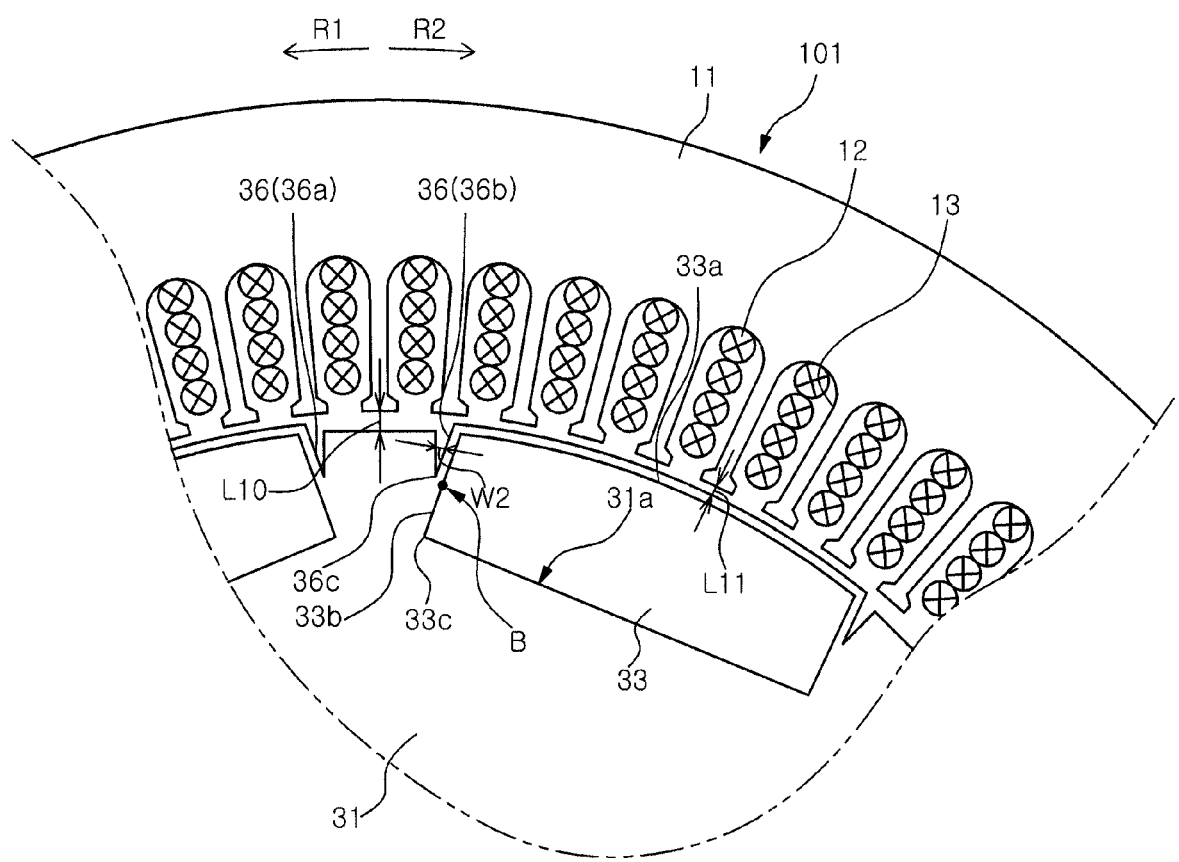
FIG. 9 is an enlarged view of the motor shown in FIG. 8.

In the second embodiment, as shown in FIG. 9, the rotor core 31 is configured such that an average value of a gap length L10 (e.g., about 1 mm) between the stator core 11 and the second magnetic pole portions 35 is larger than that of a gap length L11 (e.g., about 0.4 mm) between the stator core 11 and the first magnetic pole portions 34. That is, the outer peripheral surface of the rotor core 31 in the second magnetic pole portions 35 is disposed more inward than the outer peripheral surface of the rotor core 31 in the first magnetic pole portions 34.

The surface 33a of each of the permanent magnets 33 on the side of the stator core 11 and an outer peripheral portion 31b of each of the first magnetic pole portions 34 of the rotor core 31 are configured to have substantially the same radius of curvature as that of the inner periphery of the stator core 11. Thus, the gap length L11 (e.g., about 0.4 mm) between the stator core 11 and the first magnetic pole portions 34 is substantially equal along the circumferential direction. Also, the outer periphery of the second magnetic pole portions 35 is configured to have substantially the same radius of curvature as that of the rotor core 31 (stator core 11). Thus, the gap length L10 (about 1 mm) between the stator core 11 and the second magnetic pole portions 35 is substantially equal along the circumferential direction.

As shown in FIGS. 8 and 9, notches 36 are provided in portions of the second magnetic pole portions 35 on the side of the permanent magnets 33. The notches 36 include notches 36a and 36b. The notch 36a is provided at a portion of the second magnetic pole portion 35 adjacent to the permanent magnet 33 on one side (direction of arrow R1) of the circumferential direction. The notch 36b is provided at a portion of the second magnetic pole portion 35 adjacent to the permanent magnet 33 on the other side (direction of arrow R2) of the circumferential direction.

Each of the notches 36 is formed in a substantially V shape such that a width W1 of the notch 36 is gradually reduced toward the inner peripheral side of the rotor core 31 when viewed from the axial direction. Additionally, the bottom end 36c of the notch 36 on the inner peripheral side of the rotor core 31 is located radially outward of the bottom end 33c of the side surface 33b of the permanent magnet 33 on the inner peripheral side of the rotor core 31 (and a midpoint (point B) of the side surface 33b of the permanent magnet 33 in the thickness direction thereof). The remaining configuration of the second embodiment is the same as the first embodiment.

In the second embodiment, as described above, the permanent magnets 33 are embedded in the vicinity of the outer periphery of the rotor core 31 such that the surface 33a of each of the permanent magnets 33 on the side of the stator core 11 is not exposed. Further, the rotor core 31 is configured such that the average gap length L10 between the stator core 11 and the second magnetic pole portions 35 is larger than the average gap length L11 between the stator core 11 and the first magnetic pole portions 34. Thus, since the surface 33a of each of the permanent magnets 33 on the side of the stator core 11 is covered with the rotor core 31, it is possible to effectively suppress the permanent magnets 33 from popping out toward the stator core 11.

In addition, other effects of the second embodiment are the same as those of the first embodiment.

It should be considered that the embodiments disclosed herein are illustrative in all respects and not restrictive. The scope of the present disclosure is indicated by the appended claims rather than the foregoing description of the embodiments, and includes the equivalent of the claims and all modifications within the scope thereof.

For example, in the first and second embodiments, the motor has been described as an example of the rotary electric machine, but the disclosed embodiments are not limited thereto. For example, the disclosed embodiments may be applied to a generator serving as another example of the rotary electric machine. Further, the disclosed embodiments are applicable to a vehicle, ship or the like.

Also, in the first embodiment, a case where only the gap length between the stator core and the permanent magnets (first magnetic pole portions) varies along the circumferential direction has been described, but the disclosed embodiments are not limited thereto. For example, only the gap length between the stator core and the second magnetic pole portions may be varied along the circumferential direction, and the gap lengths between the stator core and both the first magnetic pole portions and the second magnetic pole portions may be varied along the circumferential direction.

Additionally, in the first and second embodiments, a case where the permanent magnets have a shape such that the thickness of the central portion in the circumferential direction is larger than the thickness of the end portion in the circumferential direction has been described, but the permanent magnets may have another shape. For example, the permanent magnets may have a rectangular shape or an arcuate shape having the same thickness in the circumferential direction.

Further, in the first and second embodiments, a case where the permanent magnets are formed of ferrite permanent magnets has been described, but the present disclosure is not limited thereto. For example, the permanent magnets may be made of a material containing rare earths such as neodymium.

In the first embodiment, there has been described a case where the permanent magnets are arranged in the vicinity of the outer periphery of the rotor core to expose at least a portion (portion other than both end portions) of the surface of the permanent magnet on the side of the stator core, but the present disclosure is not limited thereto. For example, the permanent magnets may be arranged in the vicinity of the outer periphery of the rotor core to expose all the surface of the permanent magnet on the side of the stator core.

Also, in the first and second embodiments, there have been described cases where the gap length of a portion of the permanent magnet closest to the stator core is about 0.4 mm and the average gap length L2 between the rotor core and the second magnetic pole portions is about 1 mm has been described, and where the average gap length between the stator core and the first magnetic pole portions is about 0.4 mm and the average gap length L2 between the rotor core and the second magnetic pole portions is about 1 mm, respectively. However, values of the gap lengths are not limited thereto. For example, if the rotor core is configured such that the average gap length between the stator core and the second magnetic pole portions is larger than the average gap length between the stator core and the first magnetic pole portions, each of the gap lengths may have a value other than about 1 mm and about 0.4 mm.

Figure 10:
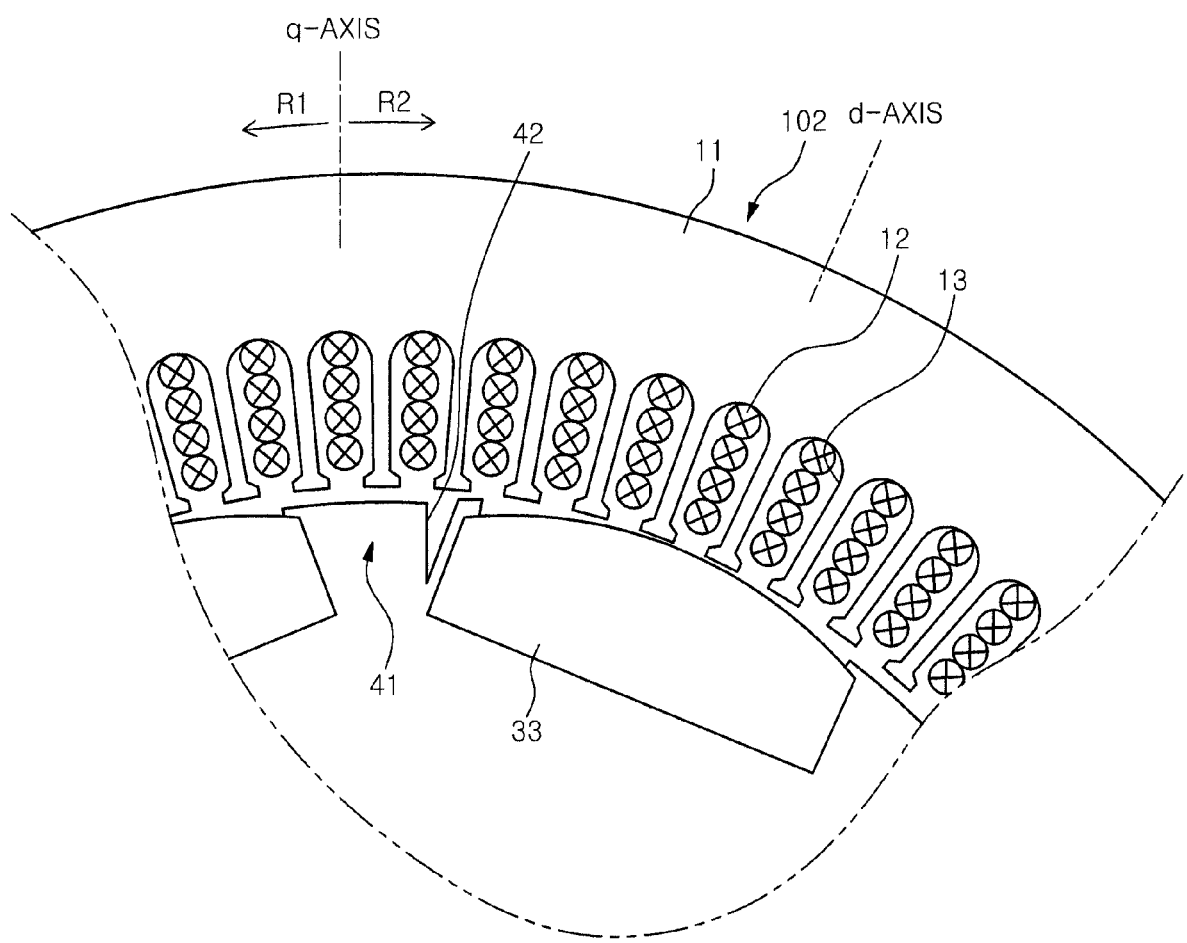
FIG. 10 is a plan view of a motor according to a modification example of the first embodiment.

Additionally, in the first and second embodiments, a case where two notches are provided in each of the second magnetic pole portions has been described, but the number of the notches is not limited thereto. For example, as shown in a modification example of the first embodiment illustrated in FIG. 10, one notch 42 may be provided at one side portion of the second magnetic pole portion 41 on the side of the permanent magnet 33 (e.g., direction of arrow R2).

That is, second magnetic pole portions 41 may be formed in a shape asymmetrical about the q-axis of the motor 102. Accordingly, unlike the case where the second magnetic pole portions are formed in a shape symmetrical about the q-axis, it is possible to vary the motor characteristics depending on the direction of rotation by changing the saturation of the magnetic flux of the q-axis differently from the symmetric case. The motor 102 is also an example of "rotary electric machine" in accordance with the disclosed embodiments.

Also, in the first and second embodiments, a case where the permanent magnets are formed such that their surfaces on the side of the stator core have a cross-sectional shape of an arcuate shape has been described, but the cross-sectional shape of the permanent magnets is not limited thereto. For example, the permanent magnets may be formed to have a substantially rectangular cross-sectional shape.

Figure 11:
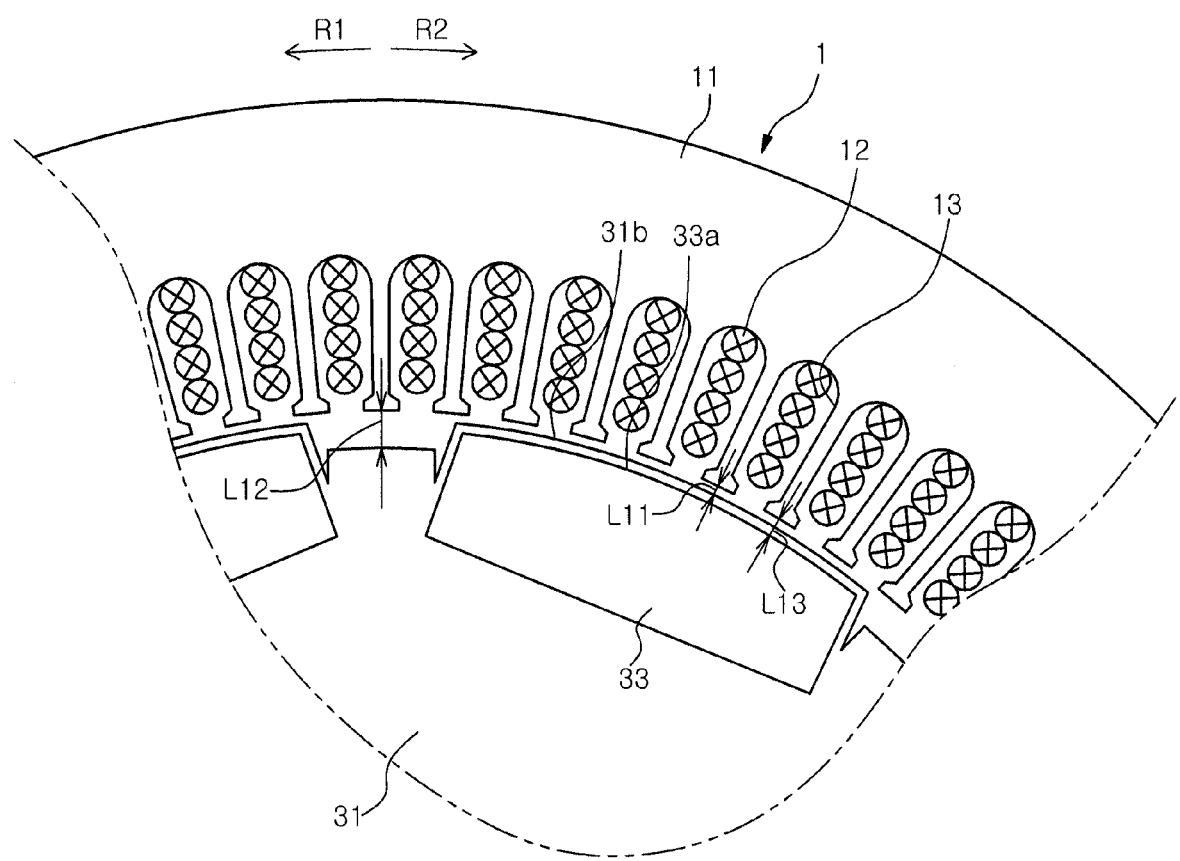
FIG. 11 is a plan view of a motor according to a modification example of the second embodiment.

In the second embodiment, a case where an interval between the stator core 11 and the surface 33a of the permanent magnet 33 is larger than the gap length L10 between the stator core 11 and the second magnetic pole portions 35 has been shown in FIG. 9, but the present disclosure is not limited thereto. For example, as shown in a modification example of the second embodiment illustrated in FIG. 11, it may be configured such that an interval L13 between the stator core 11 and the surface 33a of the permanent magnet 33 is smaller than a gap length L12 between the stator core 11 and the second magnetic pole portions 35.

What is claimed is:

1. A rotary electric machine comprising:
a rotor core in which first magnetic pole portions having permanent magnets and second magnetic pole portions having no permanent magnets are alternately arranged in a circumferential direction; and
a stator core which is arranged to face an outer periphery of the rotor core, the rotor core being configured such that an average gap length between the stator core and the second magnetic pole portions is larger than an average gap length between the stator core and the first magnetic pole portions,
wherein, when viewed along an axial direction of the rotor core, a thickness of end portions of the permanent magnets in the circumferential direction is larger than a minimum interval between permanent magnets of adjacent two of the first magnetic pole portions.

2. The rotary electric machine of claim 1, wherein a thickness of each of the permanent magnets in a direction of a d-axis magnetic flux passing therethrough is larger than the minimum interval between the permanent magnets of the adjacent two of the first magnetic pole portions.

3. The rotary electric machine of claim 2, wherein a thickness of the each of the permanent magnets in a radial direction of the rotor core is larger than the minimum interval between the permanent magnets of the adjacent two of the first magnetic pole portions.

4. The rotary electric machine of claim 2, wherein the permanent magnets are embedded in the vicinity of the outer periphery of the rotor core.

5. The rotary electric machine of claim 1, wherein a thickness of the each of the permanent magnets in a radial direction of the rotor core is larger than the minimum interval between the permanent magnets of the adjacent two of the first magnetic pole portions.

6. The rotary electric machine of claim 5, wherein the permanent magnets are embedded in the vicinity of the outer periphery of the rotor core.

7. The rotary electric machine of claim 6, wherein the permanent magnets are embedded in the vicinity of the outer periphery of the rotor core along the circumferential direction.

8. The rotary electric machine of claim 1, wherein the permanent magnets are embedded in the vicinity of the outer periphery of the rotor core.

9. The rotary electric machine of claim 8, wherein the permanent magnets are embedded in the vicinity of the outer periphery of the rotor core along the circumferential direction.

10. The rotary electric machine of claim 9, wherein each of the permanent magnets has a shape such that a thickness of a circumferential central portion is larger than a thickness of end portions thereof in the circumferential direction.

11. The rotary electric machine of claim 10, wherein the permanent magnets are embedded in the vicinity of the outer periphery of the rotor core to expose at least a portion of a surface of the permanent magnet facing the stator core.

12. The rotary electric machine of claim 10, wherein the permanent magnets are embedded in the vicinity of the outer periphery of the rotor core not to expose a surface of the permanent magnet facing the stator core.

13. The rotary electric machine of claim 9, wherein each of the second magnetic pole portions has at least one notch provided near the permanent magnet adjacent thereto.

14. The rotary electric machine of claim 8, wherein each of the second magnetic pole portions has at least one notch provided near the permanent magnet adjacent thereto.

15. The rotary electric machine of claim 1, wherein each of the permanent magnets has a shape such that a thickness of a circumferential central portion is larger than a thickness of end portions thereof in the circumferential direction.

16. The rotary electric machine of claim 1, wherein the permanent magnets are embedded in the vicinity of the outer periphery of the rotor core to expose at least a portion of a surface of the permanent magnet facing the stator core.

17. The rotary electric machine of claim 1, wherein the permanent magnets are embedded in the vicinity of the outer periphery of the rotor core not to expose a surface of the permanent magnet facing the stator core.

18. The rotary electric machine of claim 1, wherein each of the permanent magnets is formed of a ferrite permanent magnet.

19. The rotary electric machine of claim 18, wherein each of the second magnetic pole portions has at least one notch provided near the permanent magnet adjacent thereto.

20. A rotary electric machine comprising:
a rotor core in which first magnetic pole portions having permanent magnets and second magnetic pole portions having no permanent magnets are alternately arranged in a circumferential direction; and
a stator core which is arranged to face an outer periphery of the rotor core, the rotor core being configured such that an average gap length between the stator core and the second magnetic pole portions is larger than an average gap length between the stator core and the first magnetic pole portions,
wherein a thickness of each of the permanent magnets in a radial direction of the rotor core is larger than a minimum interval between permanent magnets of adjacent two of the first magnetic pole portions, and
wherein, when viewed along an axial direction of the rotor core, a thickness of end portions of the permanent magnets in the circumferential direction is larger than the minimum interval between the permanent magnets of the adjacent two of the first magnetic pole portions.

* * * * *